Oct. 14, 1941.  E. F. FISHER  2,259,029

SLUDGE SEPARATOR

Filed July 23, 1937

Inventor
Ernest F. Fisher,
By Raymond Jones,
Attorney

Patented Oct. 14, 1941

2,259,029

UNITED STATES PATENT OFFICE 2,259,029

SLUDGE SEPARATOR

Ernest F. Fisher, Springfield, Ill.

Application July 23, 1937, Serial No. 155,316

4 Claims. (Cl. 210—58)

This invention relates to a sludge separator and, more particularly, to a device adapted to separate water from a sludge which has been formed during the operation of a dust collector system wherein the dust has been removed from air, or the like, by the steps of washing the dust from a volume of air by means of a water, or other liquid, spray adapted to entrain the dust particles and form a sludge.

The main object of the invention is to provide a sludge separator that is simple in construction, economical to manufacture, and efficient in operation.

Another object is to provide a sludge separator that is adapted to separate water, or other liquid, from sludge in an effective manner and in a minimum of time.

A further object is to provide a sludge separator comprising means for readily removing the deposit of heavy sludge or sediment which is formed adjacent the bottom of the separator.

Other objects and advantages will become apparent in the specification which follows and the disclosure of the drawing, wherein—

Figure 1:
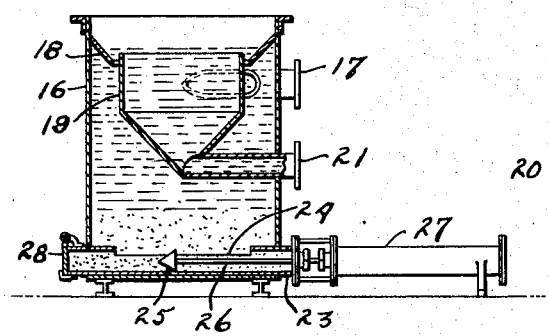
Fig. 1 is a view, in section, of a form of sludge separator.
Figure 2:
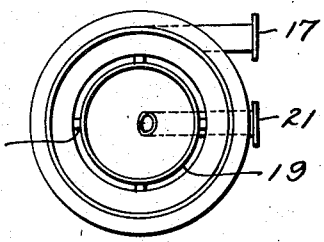
Fig. 2 shows a plan view of the separator shown in Fig. 1.

In Fig. 1, the separator is shown as a circular sludge collecting tank 16. A conduit 17 which receives its supply of dust bearing water, or other liquid, in the form of a slurry from a dust collector feeds into the sludge collecting tank 16 tangentially of the side wall of the tank. This slurry feeds into the tank with a whirling motion whereupon the dust therein settles to the bottom forming a sludge. The sludge tank is provided with a frustro-conical baffle 18 near its top and above the water inlet. The baffle 18 extends downwardly and inwardly to direct the flow of dust bearing liquid toward the bottom of the tank.

Concentrically located within the sludge tank 16 is a de-watering tank 19 which is supported by means of braces 20 extending radially inwardly from the lower rim of the baffle 18. The dewatering tank 19 is circular and provided with an inverted conical-shaped bottom. The top of this tank extends above the lower rim of the baffle 18. The tank 19 is further provided with an outlet conduit 21 located at the apex of its conical bottom.

The sludge tank 16 is provided at its bottom with a diametrically located pipe 23 extending through the side walls of the tank 16 at both sides thereof and having a cut-away portion 24 in its upper side to receive sludge as it forms. A plunger 25 carried by a rod 26 is mounted within the pipe 23 and is adapted to force sludge from the free end thereof. The plunger mechanism is operated by fluid pressure means 27 shown generally. The outlet end of the sludge removal pipe is provided with a pivotally mounted gate 28.

In operation, dirt bearing liquid is fed by the conduit 17 through the inlet in the sludge tank 16. This slurry enters the sludge tank tangentially to the side wall and is directed downwardly with a whirling motion by the baffle 18. The dirt in the water, or other liquid, settles to the bottom of the tank where it forms a sludge which is deposited in the sludge removal pipe 23. The clear liquid rises along the side wall of the tank 19, passing between the side wall of this tank 19 and the lower rim of the baffle 18 and overflows into the tank 19. The clear liquid which collects in the tank 19 passes into the conduit 21 to be withdrawn by a pump and recirculated through the dust collector. The sludge which collects in the bottom of the sludge tank 16 and in the sludge removal pipe 23 may be removed periodically by opening the outlet gate 28 and operating the fluid pressure means 27 to force the plunger 25 through pipe 23 and expel the sludge.

Figure 3:
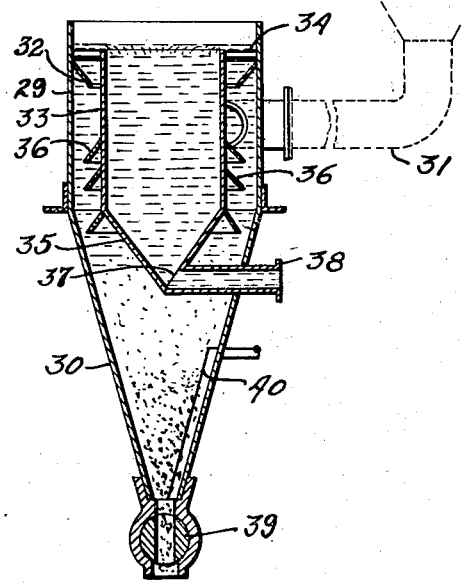
Fig. 3 is a view, in section, of a modified form of sludge separator.
Figure 4:
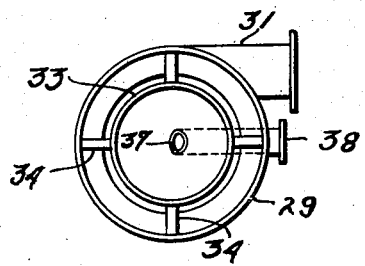
Fig. 4 shows a plan view of the separator shown in Fig. 3.

In Fig. 3, the separator is shown as a circular tank 29 having an inverted conical-shaped bottom 30. A conduit 31 which receives its supply of dust bearing liquid from the dust collector 31', feeds into the tank 29 tangentially of the side wall of the tank. The slurry enters the tank with a whirling motion whereupon the dust settles to the bottom, forming a sludge. The sludge tank 29 is provided with a frustro-conical baffle 32 near its top and above the slurry inlet. The baffle 32 extends downwardly and inwardly to direct the flow of dust bearing liquid toward the bottom of the tank 30 and away from the path of the clear liquid. A dewatering tank 33 is concentrically located within the sludge tank and is supported by means of braces 34 extending radially inwardly from the side wall of the sludge tank 29. The tank 33 is circular and is provided with an inverted conical-shaped bottom 35. The top of the tank 33 extends above the baffle 32. The tank 33 is further provided with a plurality of baffles 36 which are circular in shape and attached to the side wall thereof. These baffles extend downwardly and away from the side wall of the de-watering tank 33. The tank 33 is provided with an outlet 37 at the apex of its conical bottom to which is connected an outlet conduit 38 which leads to a liquid pump.

The sludge tank 29 is provided at its bottom with a sludge cock 39 to permit periodic removal of sludge which collects. A blow-out pipe 40 is provided near the sludge cock 39 to direct an air blast through the sludge and the outlet to facilitate removal of sludge.

In operation, dirt bearing liquid is fed from conduit 31 into the sludge tank 29 through the side wall and tangentially thereof. The slurry enters the sludge tank with a whirling motion by virtue of the tangential inlet and is directed downwardly and away from the flow of clear liquid by the sludge tank baffle 32. The dirt or dust in the liquid settles to the bottom of the sludge tank 30 with the assistance of the tank baffles 36 and forms a sludge. Clear liquid rises adjacent the side wall of the tank 33 passing between the side wall of the tank 33 and the baffle 32, whereupon it overflows into the de-watering tank 33. The clear liquid in the tank 33 may be removed by a pump through the outlet conduit 38 and recirculated to the dust collector. The sludge which collects in the bottom of the sludge tank 30 may be removed when desired by opening the sludge cock 39 and passing air through the blow-out line 40. The baffles 36 are effective to retard and divert the upward flow of clear liquid and assist in separating entrained dust from the liquid.

What I claim is:

1. A sludge separator comprising in combination, a main tank provided with a tangential inlet at the side through which slurry enters tangentially to the side wall of the tank and an outlet at the bottom for the removal of sludge, a second tank open at the top supported in spaced relationship to and within said main tank, the wall of said second tank extending below and above said inlet but not above the wall of the main tank, a baffle means attached over substantially the entire circumference of the inner wall of the main tank above said inlet, the free edge of said means extending downwardly and away from said wall to a point below the top of said second tank, and means for removing clear liquid from said second tank.

2. A sludge separator comprising in combination, a main tank provided with a tangential inlet at the side through which slurry enters tangentially to the side wall of the tank and an outlet at the bottom for the removal of sludge, a second tank open at the top and supported in spaced relationship to and within said main tank, the wall of said second tank extending below and above said inlet but not above the wall of the main tank, an annular baffle attached to the inner wall of said main tank above said inlet, the free edge of said baffle extending downwardly and away from said wall to a point below the top of said second tank, and means for removing clear liquid from said second tank.

3. A sludge separator comprising in combination, a main tank provided with a tangential inlet at the side through which slurry enters tangentially to the side wall of the tank and an outlet at the bottom for the removal of sludge, a second tank open at the top supported in spaced relationship to and within said main tank, the wall of said second tank extending below and above said inlet but not above the wall of the main tank, a baffle means attached over substantially the entire circumference of the inner wall of the main tank above said inlet, the free edge of said means extending downwardly and away from said wall to a point below the top of said second tank, another baffle means attached over substantially the entire circumference of the outer wall of said second tank below said inlet, the free edge of said second baffle means extending downwardly and away from the wall of said second tank, and means for removing clear liquid from said second tank.

4. A sludge separator comprising in combination, a main tank provided with a tangential inlet at the side through which slurry enters tangentially to the side wall of the tank and an outlet at the bottom for the removal of sludge, a second tank open at the top and supported in spaced relationship to and within said main tank, the wall of said second tank extending below and above said inlet but not above the wall of the main tank, an annular baffle attached to the inner wall of said main tank above said inlet, the free edge of said baffle extending downwardly and away from said wall to a point below the top of said second tank, another annular baffle attached to the outer wall of said second tank below said inlet, the free edge of said second baffle extending downwardly and away from the wall of said second tank, and means for removing clear liquid from said second tank.

ERNEST F. FISHER.